(12) United States Patent
Templin et al.

(10) Patent No.: US 9,308,776 B2
(45) Date of Patent: Apr. 12, 2016

(54) VENT PLUG FOR A HUBCAP AND METHOD OF MANUFACTURING THE SAME

(71) Applicant: AKTIEBOLAGET SKF, Gothenburg (SE)

(72) Inventors: Dave B. Templin, Elgin, IL (US); Yefim Epshetsky, Shaumburg, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 119 days.

(21) Appl. No.: 14/474,088

(22) Filed: Aug. 30, 2014

(65) Prior Publication Data
US 2016/0059625 A1 Mar. 3, 2016

(51) Int. Cl.
*B60B 27/00* (2006.01)
*B60B 7/00* (2006.01)

(52) U.S. Cl.
CPC ........... *B60B 27/0047* (2013.01); *B60B 7/0013* (2013.01); *B60B 27/0073* (2013.01); *B60B 2320/10* (2013.01); *B60B 2900/321* (2013.01); *B60B 2900/5112* (2013.01)

(58) Field of Classification Search
None
See application file for complete search history.

(56) References Cited

U.S. PATENT DOCUMENTS

| | | | | |
|---|---|---|---|---|
| 3,177,041 A | * | 4/1965 | Isenbarger | B60B 7/02 301/108.2 |
| 3,316,022 A | * | 4/1967 | Isenbarger | B60D 7/002 277/634 |
| 6,983,999 B2 | * | 1/2006 | Goettker | B60B 7/002 301/108.1 |
| 8,979,215 B2 | * | 3/2015 | Kile | B62D 55/15 301/108.2 |
| 2005/0162000 A1 | * | 7/2005 | Goettker | B60B 7/002 301/108.1 |

* cited by examiner

*Primary Examiner* — John Walters
*Assistant Examiner* — James Triggs
(74) *Attorney, Agent, or Firm* — INVENTA CAPITAL PLC

(57) ABSTRACT

A heavy duty vehicle hubcap preferably made from a plastic material and having a sidewall, an end wall with a transparent window insert formed therein, and further including a radial mounting flange. The hubcap also includes an access port formed in the hubcap body sidewall and a vent plug removably positioned in liquid tight relation within the access port defined in the hubcap. Preferably, the hubcap is vented to permit passage of gas and vapor therethrough without permitting liquid to pass into the sealed region.

12 Claims, 5 Drawing Sheets

VENT PLUG FOR A HUBCAP AND METHOD OF MANUFACTURING THE SAME

FIELD OF THE INVENTION

The present invention relates generally to vehicle components and manufacturing methods, and more particularly to hubcaps for truck, tractor, and semi-trailer wheel assemblies, and methods of making them.

BACKGROUND OF THE INVENTION

In automobiles, light trailers, and other light-duty applications, it is common for a wheel bearing assembly to be sealed relatively permanently for all or a good part of the service life of the assembly. Thus, automotive applications, permanently greased bearing assemblies are covered by opaque hubcaps (as opposed to decorative wheel covers which are sometimes incorrectly called hubcaps) which are never removed except for repairs, or for replacement of bearings and/or seals. In most cases, the bearings are permanently lubricated, or are lubricated by a supply of grease coming from another portion of the sealed assembly as a whole.

In the case of large, over-the-road truck tractors and semi-trailers, and other heavy-duty applications, however, the situation is different. Vehicles of these types have extended service lives both in terms of years and in terms of miles traveled. Wheel bearing assemblies are critical components of vehicles such as these. Most commonly, these wheel assemblies include a large, heavy-duty spindle and bearings engaging one or more rotatable parts, including a rotatable hub portion that in turns supports a brake drum and a removable wheel. In driven wheel applications, the bearings usually rest in the axle housing so that the driving axle is not subject to bending loads. In these cases, while the axle housing takes most or all of the load transmitted from the tires and wheels, and these bearing sets also include one or more oil or grease seals to retain the lubricant within the sealed region, and therefore also require hubcaps.

A number of years ago, many manufacturers and fleet operators, with the aid of bearing and seal suppliers, discovered that the life of ball or roller bearing type assemblies could be extended substantially by using oil rather than grease as the lubricant. Thus, the oil, although more fluent (less viscous) than grease, successfully addressed the problems of flushing dirt from the interfaces between metal parts. Modem oils are also formulated in such a way as to suspend entrained dirt and various other residues within the oil. In this way, as in automotive crankcases or other applications, the oil can be periodically drained and replaced with new, fresh oil, thus removing the grit and contaminants. This concept was brought to practical reality by the development of seals capable of handling low viscosity oils opposed to merely being able to impede leakage of semi-solid or gel materials such as greases.

Numerous prior art hubcap designs have been disclosed in U.S. Pat. No. 3,064,982 to Stephens, U.S. Pat. No. 3,316,022 to Isenbarger, U.S. Pat. No. 4,073,540 to Jackowski, U.S. Pat. No. 5,024,488 to Lindhuber et al., and U.S. Pat. No. 5,505, 525, to Denton. To the extend effective, these prior art design had disadvantages. For example, of the prior art designs included a vent plug with internal pockets wherein oil tension lead to oil accumulation and the potential for light oil leakage. Another prior art vent plug design taught a venting section formed as "+", i.e. "plus" shaped vent, having several wedges designed to permit passage of gas and vapor therethrough. Unfortunately, when in a non-vented mode, these wedges of the venting section failed to close properly and left voids therebetween to permit liquid, i.e. oil to escape from the sealed region and allow debris from outside to enter the voids thereby reducing lifespan of the hubcaps.

Therefore, an opportunity exists for an improve design of the vent plug that will prevent debris to enter into the hubcaps thereby increasing lifespan of the hubcaps and allowing oil not to flow away to the outside from the hubcap.

Another opportunity exists for an improve design of the vent plug that will open when pressurized to release the internal pressure at the same time allowing for minimal oil leakage when opened.

Still another opportunity exists for an improve design of the vent plug that is oil-impermeable and provide a positive mechanical barrier against the entrance of contaminants of all kinds.

SUMMARY OF THE INVENTION

While the invention is capable of being embodied in different forms, a description of a preferred embodiment thereof will be given wherein the application is that of a hubcap for a trailer or semi-trailer hub assembly for a semi-trailer truck. A hubcap assembly connected to a wheel hub surrounding a spindle surrounding a central axis extending through the wheel hub. The hubcap assembly includes a hubcap body having a sidewall extending to a mounting flange portions to connect with the wheel hub. An insert portion is mechanically interlocked with the sidewall of the hubcap body. The insert portion presents an opening. The hubcap assembly includes an elastomeric plug surrounding the central axis. The elastomeric plug is adaptable to be mechanically engaged with the insert portion and presents a cylindrical surface, an end surface, and a shoulder surface to mechanically engage the insert portion.

A vent portion of the elastomeric plug has a first section of a first thickness and a second section of a second thickness surrounding the first section. The vent portion extends from an idle position as the first section and the section are located along, i.e. coplanar with the end surface to maintain a substantially atmospheric pressure within said hubcap body and a venting position as the first section extends above the end surface thereby forming a funnel shape and stretching to form an opening to release the pressure out of the hubcap body. The first section elastically returns back to the idle position thereby keeping atmospheric pressure inside the hubcap body to eliminate leakage of fluids from the hubcap body and preventing debris and foreign object to enter the hubcap body.

An object of the invention is to provide an improved elastomeric plug for the hubcap body that is oil-impermeable and provides a positive mechanical barrier against the entrance of contaminants Another object of the invention is to provide an improved hubcap which also includes an opening for replenishing or changing oil or other lubricant, with such opening being sealed by a plug that is resistant to unintentional removal.

Still another object of the invention is to provide an improved design of the vent plug that increases the lifespan of the hubcaps and allows oil not to flow away from the hubcap.

Still another object of the invention is to provide an improved design of the vent plug that opens when pressurized to release the internal pressure at the same time allowing for minimal oil leakage when opened.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
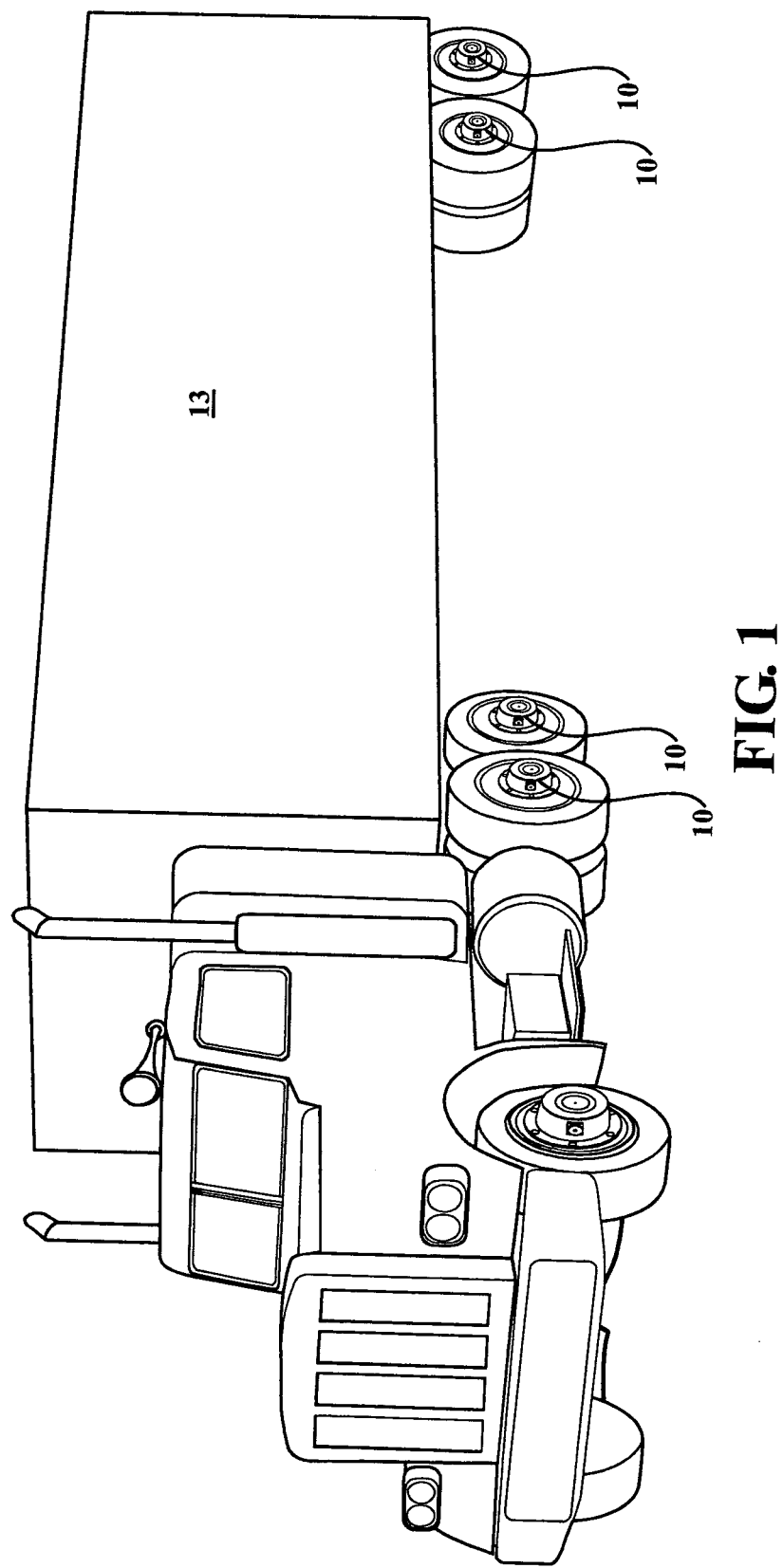
FIG. 1 is a perspective view of a truck having hubcaps on each wheel.
Figure 1A:
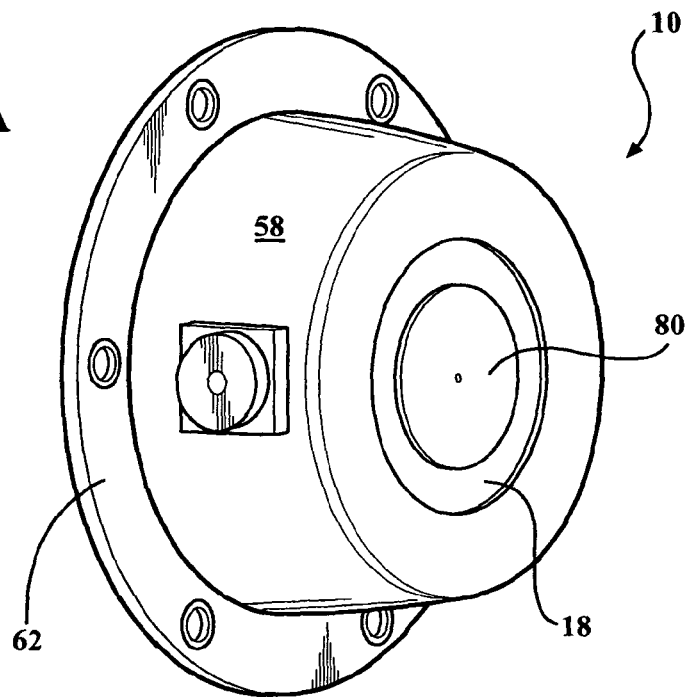
FIG. 1A is a perspective view of the hubcap of FIG. 1 and an improved vent plug connected thereto.

While the invention is capable of being embodied in different forms, a description of a preferred embodiment thereof will be given wherein the application is that of a hubcap, generally indicated at 10 in FIG. 1 and generally shown at 10 in FIGS. 1A and 2, for a trailer or semi-trailer hub assembly, generally shown at 12 in FIG. 2 for a semi-trailer truck, generally shown at 13 in FIG. 1.

Figure 2:
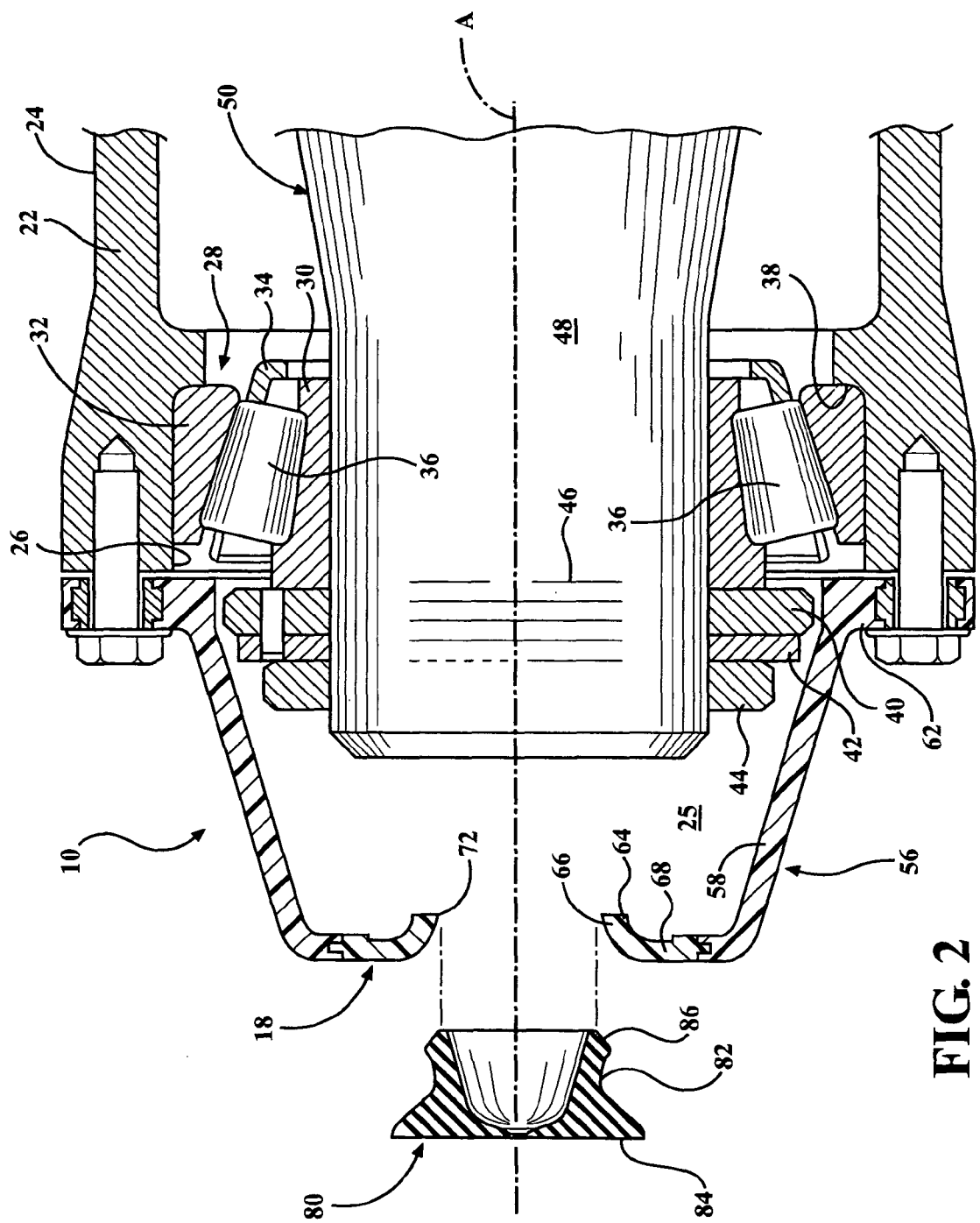
FIG. 2 is a perspective view of the improved hubcap of the invention, showing certain parts thereof in an exploded relation.

Thus, referring to the drawings in greater detail, FIG. 2 shows a hubcap assembly generally designated 10 of the invention and showing the same to include a number of principal components including a hubcap body generally designated 14 and further showing a removable elastic vent plug generally indicated at 16 positioned within a window insert generally indicated 18 forming a part of the end wall of the hubcap 10.

As shown in FIG. 2, a typical application of the hubcap 10 is shown. Here, the hubcap 10 is shown as being affixed in place over an end portion 22 of a wheel hub 24 so as to define a sealed region 25 which serves to receive and retain oil or other lubricant. The hub 24 includes a bearing counterbore 26 in which a tapered roller bearing assembly generally designated 28 is received and which is shown to include inner and outer races 30, 32, and a cage 34 positioning a plurality of tapered bearing rollers 36.

The inner race is kept in snug relation to the shoulder 38 of the counterbore 26 by a ring unit 40 backed by a spacer 42 against which a locking nut 44 is positioned. The nut 44 is threaded internally to engage cooperating threads 46 on the reduced diameter end portion 48 of a spindle generally designated 50.

The hubcap assembly 10 includes a number of components, including a main body portion generally designated 56, which in turn is shown to include tapered sidewalls 58, the outer end wall, and an axially inner composite mounting flange 62. The hubcap assembly 10 further includes the transparent window insert 18 to include a window center section 68, a peripheral tongue 70 contained within and bonded to an inner margin 60 of the end wall 19. The window insert 18 also includes an inturned inner flange 66 having an end face surface 64 joined to a tapered wall portion 72 that acts as a pilot or centering surface for the window insert or insert portion 18.

As best illustrated in FIGS. 2, 3, 4A and 4B, an elastomeric plug, i.e. a vent plug, generally shown at 80, surrounds a central axis A of the spindle 50 and is adaptable to be mechanically engaged with the insert portion 18. The vent plug 80 presents a cylindrical surface 82, an end surface 84, and a shoulder surface 86 to mechanically engage the insert portion 18.

Figure 3:
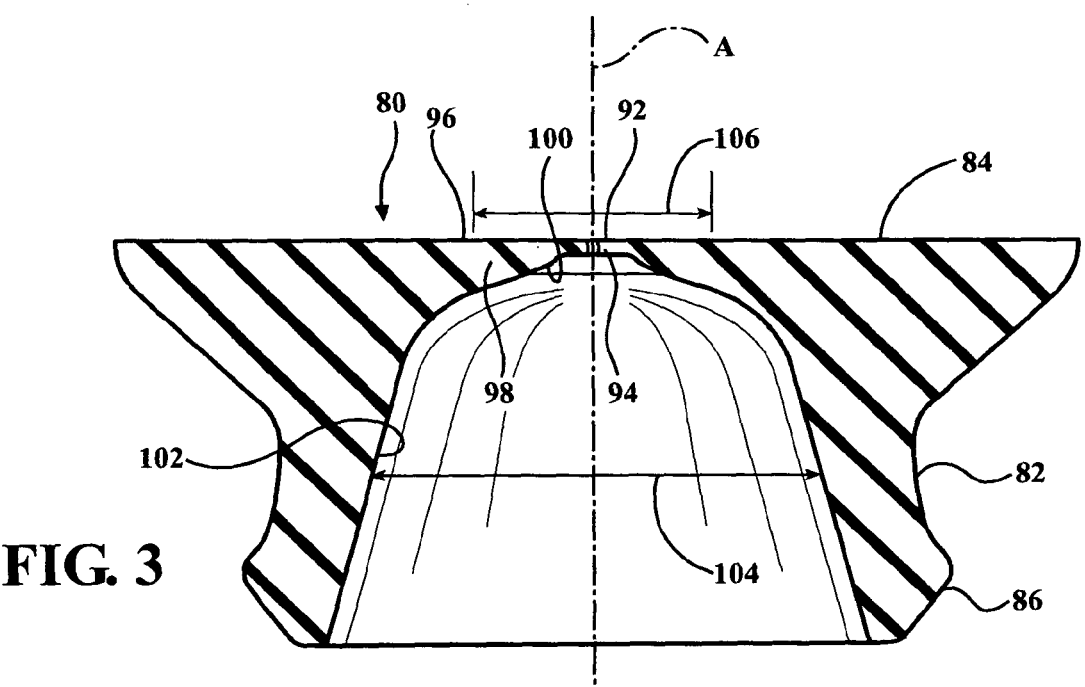
FIG. 3 is a cross sectional view of the vent plug.
Figure 4A:
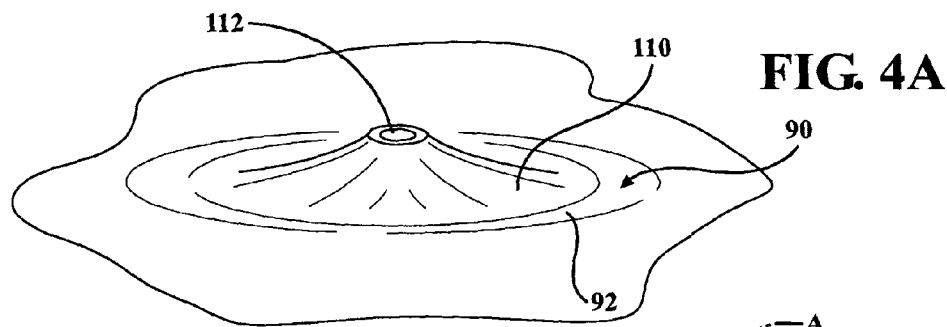
FIG. 4A is a partial perspective view of the central portion of the vent plug in a vented mode to permit passage of pressure, gas and vapor therethrough.
Figure 4B:
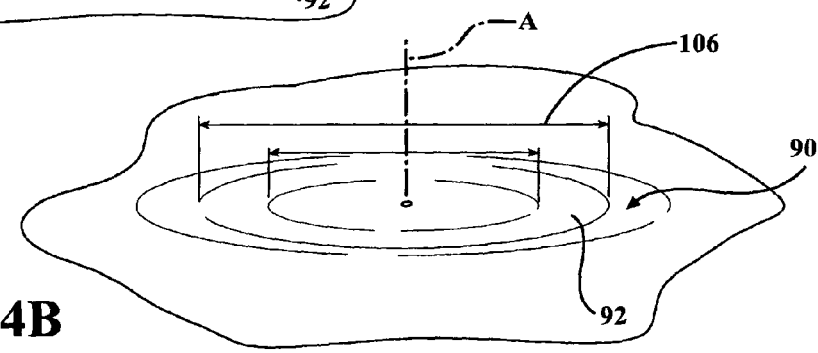
FIG. 4B is a partial perspective view of the central portion of the vent plug in a non-vented mode to prevent contaminants and debris to pass into the sealed region from outside and preventing oil leakage.

As best shown in FIGS. 3, 4A and 4B, a vent portion, generally indicated at 90, of the elastomeric plug 80, includes a first section 92 with a first thickness 94 and a second section 96 with a second thickness 98 surrounding the first section 92. The first thickness 94 is thinner than the second thickness 98. An annular inclined 100 wall extends from the first section 92 to the second section 96 thereby diverging from the first section 92 to the second section 96.

Alluding to the above, an inner wall 102 presents a diameter 104 that is wider than the diameter 106 of the second section 96. As best shown in FIGS. 4A and 4B, as pressure is accumulated inside the hubcap body 10, the vent portion 90 extending from an idle position, shown at FIG. 4B as the first section 92 and the second section 96 are located along the end surface 84 to a venting position, shown in FIG. 4A. In the venting position, the first section 92 extends above the end surface 84 thereby forming a funnel shape, generally indicated at 110, and stretching to form an opening 112 to release the pressure out of the hubcap body 10 expanding radially away from the central axis A.

After pressure is released from the hubcap body 10, the funnel shape 110 of the first section 92 elastically returns, i.e. is released back to the idle position of FIG. 4B, as there is no pressure from the hubcap 10 thereby eliminating leakage of fluids, such as lubricants and oils from the hubcap body 10 and preventing debris and foreign object to enter said hubcap body. As the first section 92 returns from the venting position back to the idle position, the opening 112 closed or seals to prevent any ingress of fluids and contaminants into the hubcap body 10.

Figure 5A:
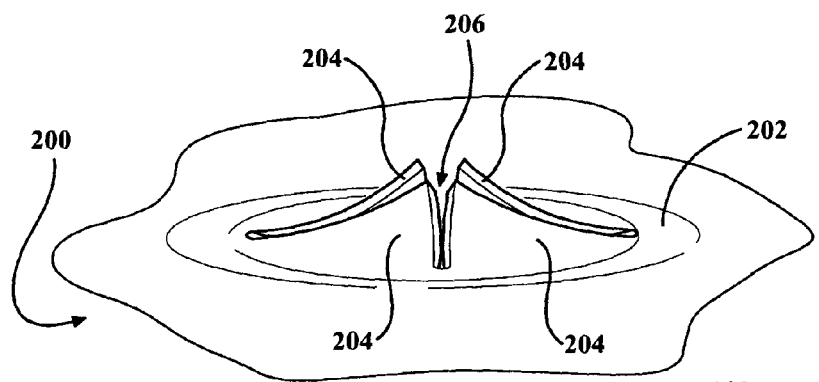
FIG. 5A is a partial perspective view of the central portion of a prior art vent plug in a vented mode, wherein venting section is formed as "+", i.e. "plus" shaped vent to permit passage of gas and vapor therethrough.
Figure 5B:
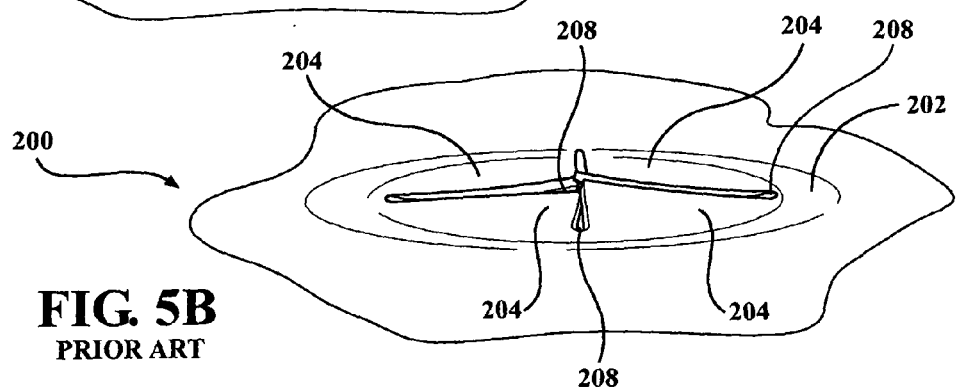
FIG. 5B is a partial perspective view of the central portion of the prior art vent plug, shown in FIG. 5A, in a non-vented mode, wherein venting section are closed but still define voids therebetween to permit liquid to pass into the sealed region.

Alluding to the above, the expansion of the first section 92 to the funnel shape 110 and exposure to the opening 112 and then release back to the idle position to seal the hubcap body 10 provides numerous advantages of a prior art vent plug design, generally shown at 200 in FIGS. 5A and 5B. FIG. 5A, for example, is a partial perspective view of a central portion 202 of the prior art vent plug 200 in a vented mode, wherein venting section is formed as "+", i.e. "plus" shaped vent having four wedges 204 to permit passage of gas and vapor therethrough. FIG. 5A clearly shows an opening, generally indicated at 206, defined between the wedges 204. FIG. 5B is a partial perspective view of the central portion 202 of the prior art vent plug 200, shown in a non-vented mode, wherein the wedges 204 of the venting section are closed but still define voids 208 therebetween to permit liquid to pass into the sealed region of the hubcap (not shown). This prior art design does not prevent complete sealing of the hubcap and allows debris and foreign object to enter the hubcap body.

Figure 6:
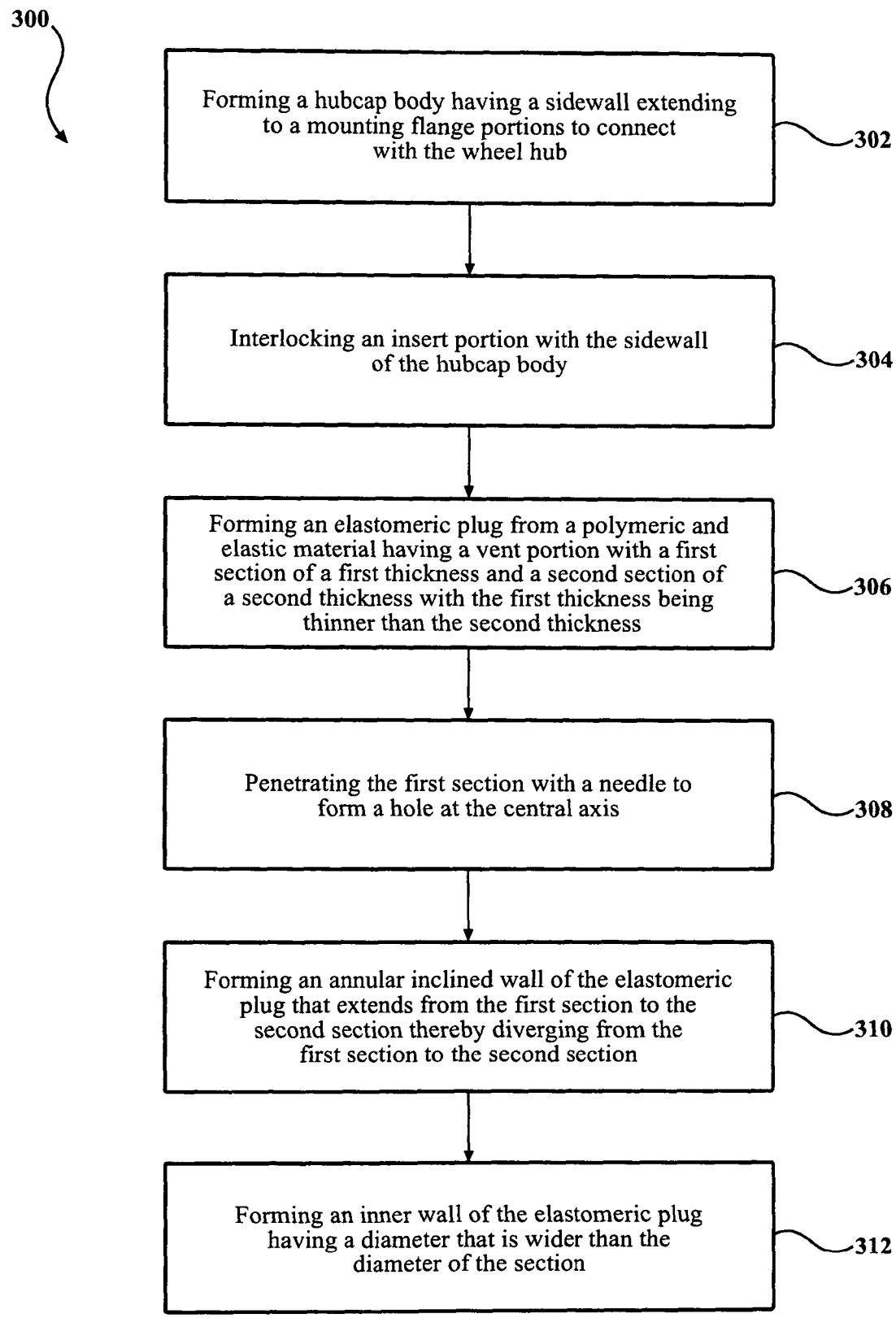
FIG. 6 illustrates a diagram of a method of the present invention.

A method of fabricating a hubcap assembly connected to a wheel hub surrounding a spindle surrounding a central axis extending through the wheel hub is generally shown at 300 in FIG. 6. The method includes the step 302 of forming a hubcap body having a sidewall extending to a mounting flange portions to connect with the wheel hub. The method 300 further includes the step 304 of mechanically interlocking an insert portion with the sidewall of the hubcap body. The step 306 is forming an elastomeric plug and mechanically engaging the elastomeric plug with the insert portion.

As the elastic plug is formed in the step 306, a vent portion is being formed with a first section of a first thickness and a second section of a second thickness by forming the first thickness thinner than the second thickness. After the first section is formed, a needle is used to penetrate the first section to form a hole at the central axis, as shown in the step 308 of FIG. 6. The method 300 as set forth in claim 6, including the step 310 of forming an annular inclined wall of the elastomeric plug that extends from the first section to the second section thereby diverging from the first section to the second section.

The method 300 further includes the step 312 of forming an inner wall of the elastomeric plug having a diameter that is wider than the diameter of the second section. The elastic plug can be formed by injection molding process but other fabrication processes can be used without limiting the scope of the present invention. The elastic plus is formed from polymeric and elastic materials without limiting the scope of the present invention.

It will thus be seen that the present invention provides a novel hubcap assembly and method for making the same, having a number of novel advantages and characteristics, including those referred to specifically herein and others which are inherent in the invention. A preferred form of hubcap and method of making it having been described in detail, it is anticipated that the variations in the described form of construction and method may occur to those skilled in the art, and that variations and modifications to the product and method may be made without departing from the spirit of the invention or the scope of the appended claims.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A hubcap assembly connected to a wheel hub surrounding a spindle surrounding a central axis extending through the wheel hub, said hubcap assembly comprising:
a hubcap body having a sidewall extending to a mounting flange portions to connect with the wheel hub;
an insert portion mechanically interlocked with said sidewall of said hubcap body, said insert portion presenting an opening;
an elastomeric plug surrounding the central axis, said elastomeric plug adaptable to be mechanically engaged with said insert portion and presenting a cylindrical surface, an end surface, and a shoulder surface to mechanically engage said insert portion; and
a vent portion of said elastomeric plug, said vent portion including a first section of a first thickness and a second section of a second thickness, said vent portion extending from an idle position as said first section and said section are located along and coplanar with said end surface with said first section being sealed and a venting position as said first section extends above said end surface thereby forming a funnel shape and stretching to form an opening to release pressure out of said hubcap body and elastically returning back to said idle position thereby eliminating leakage of fluids from said hubcap body and preventing debris and foreign object to enter said hubcap body.

2. The hubcap assembly as set forth in claim 1, wherein said first thickness is thinner than said second thickness.

3. The hubcap assembly as set forth in claim 1, wherein said elastomeric plug includes an annular inclined wall extending from said first section to said second section thereby diverging from said first section to said second section.

4. The hubcap assembly as set forth in claim 1, wherein said elastomeric plug includes an inner wall having a diameter that is wider than the diameter of said second section.

5. The hubcap assembly as set forth in claim 1, wherein said elastomeric plug is formed from a polymeric and elastic material.

6. A method of fabricating a hubcap assembly connected to a wheel hub surrounding a spindle surrounding a central axis extending through the wheel hub, said method comprising:
forming a hubcap body having a sidewall extending to a mounting flange portions to connect with the wheel hub;
mechanically interlocking an insert portion with the sidewall of the hubcap body;
forming an elastomeric plug and mechanically engaging the elastomeric plug with the insert portion; and
forming a vent portion with a first section of a first thickness and a second section of a second thickness to extend the first section from an idle position as the first section is sealed to a venting position as the first section extends to form a funnel shape in response to internal pressure and is expanded to form an opening to release the internal pressure out of the hubcap body and is elastically returned back to the idle position thereby eliminating leakage of fluids from the hubcap body and to prevent debris and foreign object to enter the hubcap body.

7. The method as set forth in claim 6, including the step of penetrating the first section with a needle to form a hole at the central axis.

8. The method as set forth in claim 6, including the step of forming the vent portion of the elastomeric plug with the first thickness being thinner than the second thickness.

9. The method as set forth in claim 6, including the step of forming an annular inclined wall of the elastomeric plug that extends from the first section to the second section thereby diverging from the first section to the second section.

10. The method as set forth in claim 6, including the step of forming an inner wall of the elastomeric plug having a diameter that is wider than the diameter of the second section.

11. The method as set forth in claim 6, including the step of forming the elastomeric plug from polymeric and elastic material.

12. A hubcap assembly connected to a wheel hub surrounding a spindle surrounding a central axis extending through the wheel hub, a hubcap body having a sidewall extending to a mounting flange portions to connect with the wheel hub, an insert portion mechanically interlocked with the sidewall of the hubcap body, the insert portion presenting an opening, said hubcap assembly comprising:

an elastomeric plug surrounding the central axis and adaptable to be mechanically engaged with the insert portion and presenting a cylindrical surface, an end surface, and a shoulder surface to mechanically engage the insert portion;

a vent portion of said elastomeric plug having a first section of a first thickness a second section of a second thickness and surrounding said first section, said first thickness being thinner than said second thickness, an annular inclined wall extending from said first section to said second section thereby diverging from said first section to said second section, an inner wall having a diameter being wider than the diameter of said second section; and said vent portion extending from an idle position as said first section and said section are located along and coplanar with said end surface with said first section being sealed and a venting position as said first section extends above said end surface thereby forming a funnel shape and stretching to form an opening to release pressure out of said hubcap body and elastically returning back to said idle position thereby eliminating leakage of fluids from said hubcap body and preventing debris and foreign object to enter said hubcap body.

* * * * *